(12) United States Patent
Berg et al.

(10) Patent No.: US 7,093,257 B2
(45) Date of Patent: Aug. 15, 2006

(54) ALLOCATION OF POTENTIALLY NEEDED RESOURCES PRIOR TO COMPLETE TRANSACTION RECEIPT

(75) Inventors: Thomas B. Berg, Portland, OR (US); Stacey G. Lloyd, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 592 days.

(21) Appl. No.: 10/063,230

(22) Filed: Apr. 1, 2002

(65) Prior Publication Data

US 2003/0187906 A1 Oct. 2, 2003

(51) Int. Cl.
*G06F 9/46* (2006.01)
*G06F 15/173* (2006.01)

(52) U.S. Cl. ............... 718/104; 718/101; 709/226

(58) Field of Classification Search ........... 370/229; 709/226; 707/10; 718/101, 104
See application file for complete search history.

(56) References Cited

U.S. PATENT DOCUMENTS

| 5,465,354 | A | * | 11/1995 | Hirosawa et al. ........... 718/106 |
| 5,884,037 | A | * | 3/1999 | Aras et al. ................... 709/226 |
| 5,963,945 | A | * | 10/1999 | Pal ............................... 707/10 |
| 6,041,354 | A | * | 3/2000 | Biliris et al. ................. 709/226 |
| 6,195,622 | B1 | * | 2/2001 | Altschuler et al. ............. 703/2 |
| 2002/0150044 | A1 | * | 10/2002 | Wu et al. .................... 370/229 |

OTHER PUBLICATIONS

Zhang et al., "RED_VBR: A new approach to support delay-sensitive VBR video in packet-switched networks," 1995.*

* cited by examiner

*Primary Examiner*—William Thomson
*Assistant Examiner*—Qing-Yuan Wu
(74) *Attorney, Agent, or Firm*—Abdy Raissinia

(57) ABSTRACT

Allocating potentially needed resources for a transaction before having completely received the transaction is disclosed. An initial part of a transaction is received in first clock cycle. The resources potentially needed by the transaction are determined based on the initial part thereof that has been received, and allocated. The transaction then proceeds. The final part of the transaction is received in a final clock cycle. The resources actually needed by the transaction from the resources previously allocated are determined based on the remaining part thereof that has been received. Any unneeded remaining resources are then deallocated.

32 Claims, 7 Drawing Sheets

FIG 5

| Target (Region) | Local/Remote | Transaction | ID Cycle | Resources Allocated | |
|---|---|---|---|---|---|
| Memory (Private) | Local | any | - | - | ← 510 |
| Memory (Shared) | Local | Mem Rd | ABRT | - | ⎫ |
| | | Mem Rd/Inv | LCR | - | |
| | | Mem Wr | LCRI | PWB | ⎬ 512 |
| | Remote | Mem Rd | LUW | - | |
| | | Mem Rd/Inv | RCR | - | |
| | | Mem Wr | RCRI | PWB | ⎭ |
| Memory (CSR) | Local | Mem Rd | RUW | CSR Queue | ⎫ |
| | | Mem Wr | ABRT | CSR Queue | ⎬ 514 |
| | Remote | Mem Rd | ABRT | - | |
| | | Mem Wr | MMR | - | ⎭ |
| CSR | - | Mem Rd | MMW | CSR | ⎱ 516 |
| | | Mem Wr | n/a | CSR | ⎰ |
| Config Space (CSR) | n/a | IO Rd | ABRT | CSR Queue, PCI Bus 0 | ⎫ 518 |
| | | IO Wr | ABRT | CSR Queue, PCI Bus 0 | ⎭ |
| PCI (Config Data) | n/a | IO Rd | ABRT | PCI Bus x | ⎱ 520 |
| | | IO Wr | ABRT | PCI Bus x | ⎰ |
| PCI (MMIO) | Local | Mem Rd | ABRT | PCI Bus x | ⎫ |
| | | Mem Wr | ABRT | PCI Bus x | ⎬ 522 |
| | Remote | Mem Rd | MMR | - | |
| | | Mem Wr | MMW | - | ⎭ |
| PCI (IO) | Local | IO Rd | ABRT | PCI Bus x | ⎱ 524 |
| | | IO Wr | ABRT | PCI Bus x | ⎰ |
| PCI Bus 0 | Local | Special/IntAck | ABRT | PCI Bus 0 | ← 526 |
| P7 Bus | Local | Interrupt/PTC | ABRT | - | ⎱ 528 |
| | Remote | | n/a | - | ⎰ |
| TRR | - | Mem Wr | ABRT | - | ← 530 |

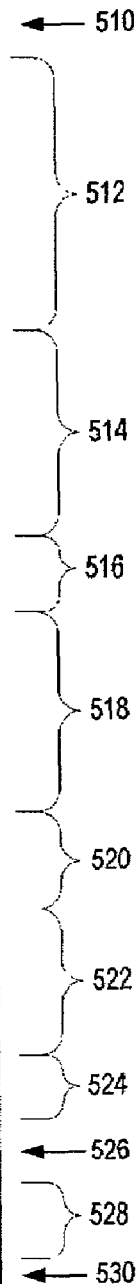

| Transaction | | Qualifier | Resource Released |
|---|---|---|---|
| Request | ID cycle | | |
| | LCR | - | - |
| | LCRI | - | |
| | | - | |
| | LUW | ATTR = WB | PWB |
| | | ATTR = WC and LEN = 64 bytes | PWB |
| | RCR | - | - |
| | RCRI | - | - |
| | RUW | ATTR = WB | PWB |
| | | ATTR = WC and LEN = 64 bytes | PWB |
| | MMR | - | - |
| | MMW | - | - |
| IO Rd | - | Addr = CF8 and BE[7:0] = 00001111 | PCI Bus 0 |
| | - | Addr = CF8 and BE[7:0]! = 00001111 | CSR Queue |
| | - | Addr = CFC and BE[3:0] = 0000 and ConfigSpace Enabled and to PCI bus | CSR Queue |
| | - | Addr != CF8 | PCI Buses x,y,z |
| IO Wr | - | Addr = CF8 and BE[7:0] = 00001111 | PCI Bus 0 |
| | - | Addr = CF8 and BE[7:0] ! = 00001111 | CSR Queue |
| | - | Addr = CFC and BE[3:0] = 0000 and ConfigSpace Enabled and to PCI bus | CSR Queue |
| | - | Addr != CF8 | PCI Buses x,y,z |
| Special/ IntAck | - | REQb[0]=1 and BE[7:0] = 0000 0000 | PCI Bus 0 |
| | - | REQb[0]=1 and BE[7:0] = 000 1000 | PCI Bus 0 |
| Interrupt/ PTC | - | - | - |

602 → Transaction
604 → Qualifier
606 → Resource Released
608, 610, 612, 614, 616
600

ALLOCATION OF POTENTIALLY NEEDED RESOURCES PRIOR TO COMPLETE TRANSACTION RECEIPT

BACKGROUND OF INVENTION

This invention relates generally to multi-processor computer systems in which transactions may be completely received over two or more clock cycles, and more particularly to allocating resources for such transactions.

There are many different types of multi-processor computer systems. A symmetric multi-processor (SMP) system includes a number of processors that share a common memory managed by a memory transaction manager. SMP systems provide scalability. As needs dictate, additional processors can be added. SMP systems usually range from two to thirty-two or more processors. One processor generally boots the system and loads the SMP operating system, which brings the other processors online. Without partitioning, there is only one instance of the operating system and one instance of the application in memory. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems. The term building block is used herein in a general manner, and encompasses a separable grouping of processor(s), other hardware, such as memory, and software that can communicate with other building blocks.

One particular type of NUMA system is the NUMA-quad (NUMA-Q) system. A NUMA-Q system is a NUMA system in which the fundamental building block is the quad, or the quad building block (QBB). Each quad can contain up to four processors, a set of memory arrays, a memory transaction manager, and an input/output (I/O) processor (IOP) that, through two host bus adapters (HBAs), accommodates two to eight I/O buses. An internal switch in each QBB allows all processors equal access to both local memory and the I/O buses connected to the local I/O processor. An application running on a processor in one QBB can thus access the local memory of its own QBB, as well as the shared memory of the other QBBs. More generally, a quad refers to a building block having at least a collection of up to four processors and an amount of memory.

A difficulty with multi-processor systems, as well as with single-processor systems, is that transactions may be multiplexed over the physical interfaces of processors, such that they are not completely received by the transaction managers in a single clock cycle. Manufacturers and designers of processors typically attempt to minimize the number of pins on their integrated circuits (ICs), typically because of cost constraints, which can necessitate the multiplexing of information sent to the transaction managers. In the case of many types of transactions, this means that the transactions cannot be completely sent by the processors in a single clock cycle, but rather are sent over two clock cycles. A transaction can be generally and, non-restrictively defined as a request from a transaction generator, such as another processor, an application-specific IC (ASIC), and so on. The request may ask that the transaction manager perform a command on a resource, such as a read command, a write command, and so on.

Because a transaction may not be completely received in a single clock cycle, the transaction manager may not be able to determine with precise specificity the resources to which the transaction relates, and thus the resources that the transaction manager should allocate. The resources may include queues, buffers, memories, and so on. The transaction manager may thus have to wait an extra clock cycle until it completely receives the transaction before the transaction manager can determine the resources the transaction needs, and thus the resources the transaction manager should allocate for the transaction. This can unnecessarily slow the system down, and furthermore may result in a reduction of transaction bandwidth. Alternatively, the transaction manager may have extra resources allocated to it on more or less a permanent basis just in case a given received transaction needs them, but this can lead to a lack of or underutilization of resources.

For these described reasons, as well as other reasons, there is a need for the present invention.

SUMMARY OF INVENTION

The invention relates to allocating potentially needed resources for a transaction before having completely received the transaction. In a method of the invention, an initial part of a transaction is received in first clock cycle. The resources potentially needed by the transaction are determined based on the initial part thereof that has been received, and allocated. A final part of the transaction is received in a final clock cycle. The resources actually needed by the transaction from the resources previously allocated are determined based on the remaining part thereof that has been received.

A system of the invention includes one or more transactions generators and a transaction manager. Each transaction generator is capable of generating transactions. The transaction manager is capable of receiving each transaction over at least one clock cycle. The transaction manager is also capable of allocating resources potentially needed by each transaction upon partially receiving the transaction in a first clock cycle, and of deallocating actually unneeded resources from the resources previously allocated after completely receiving the transaction in a final clock cycle.

An article of manufacture of the invention includes a computer-readable medium and means in the medium. The means is for allocating resources potentially needed by a transaction partially received in a first clock cycle. The means is also for deallocating actually unneeded resources from the resources previously allocated after completely receiving the transaction in a final clock cycle. Other features and advantages of the invention will become apparent from the following detailed description of the presently preferred embodiment of the invention, taken in conjunction with the accompanying drawings.

BRIEF DESCRIPTION OF DRAWINGS

FIG. 5 is a diagram of a table showing which resources are allocated as potentially needed after partial receipt of a transaction in a first clock cycle, according to an embodiment of the invention.

FIG. 6 is a diagram of a table showing which resources are deallocated as actually unneeded after complete receipt of a transaction in a second clock cycle, according to an embodiment of the invention.

DETAILED DESCRIPTION

Overview

Figure 1:
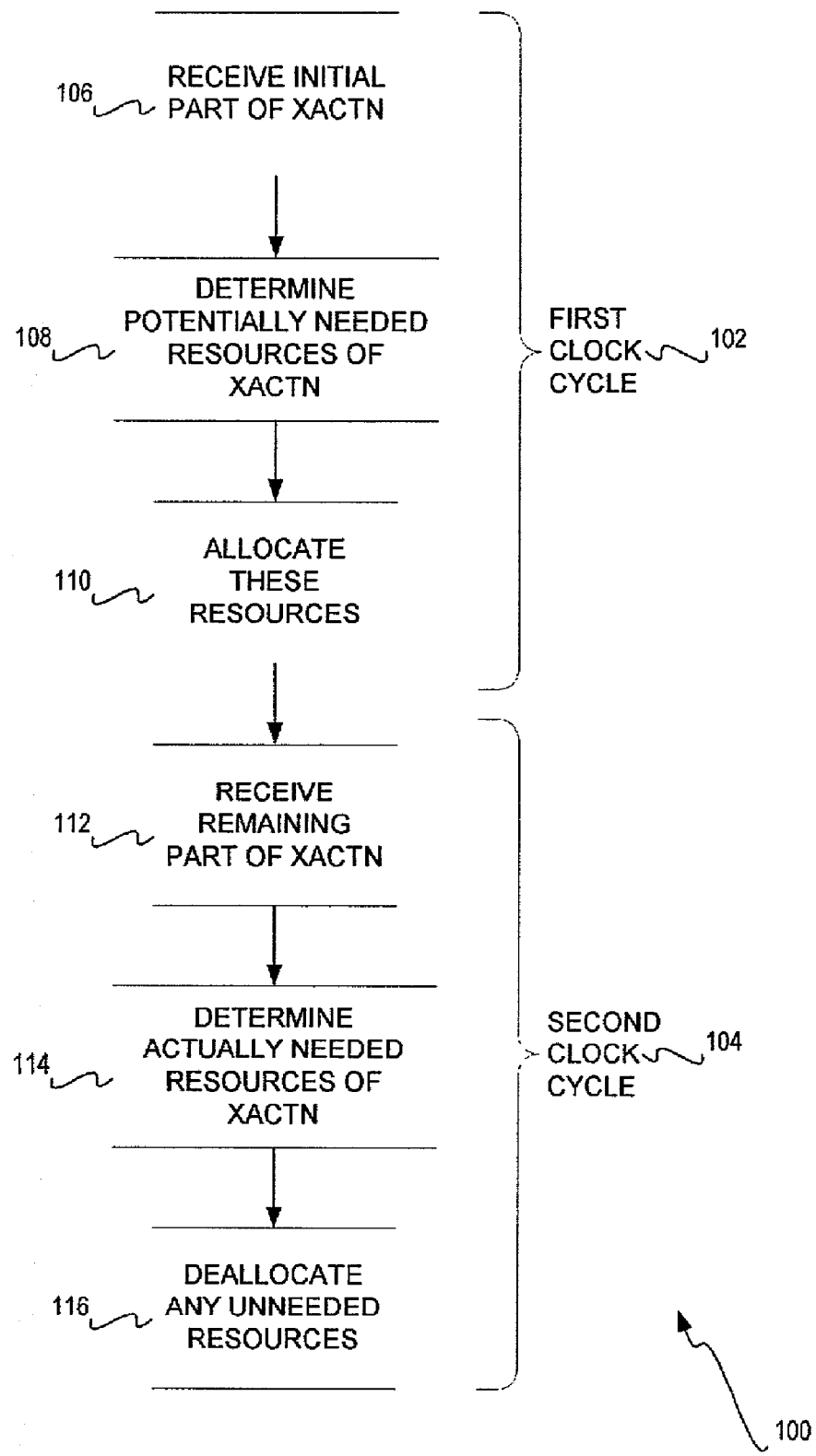
FIG. 1 is a flowchart of a method according to a preferred embodiment of the invention, and is suggested for printing on the first page of the patent.

FIG. 1 shows a method 100 according to a preferred embodiment of the invention. The method 100 is performed, such as by a transaction manager, over a first clock cycle 102 and a second clock cycle 104. In addition, parts of the method 100 may be implemented as means within a computer-readable medium of an article of manufacture. The computer-readable medium may be a recordable data storage medium, such as a floppy disk, a CD-ROM, a hard disk drive, and so on, as well as a modulated carrier signal. Furthermore, the method 100 may also include other steps and/or acts, but only those steps and/or acts that preferably illustrate performance of the method 100 are explicitly depicted in FIG. 1.

The initial part of a transaction is first received in the first clock cycle (106). Based on this initial part of the transaction, all the resources potentially needed by the transaction are determined (108), and allocated (110). Note that these resources potentially needed by the transaction may include some resources that are not actually needed, but this determination cannot be made based on the initial part of the transaction received in the first clock cycle.

In the second clock cycle, the remaining part of the transaction is received (112). Based on this remaining part of the transaction, the resources actually needed by the transaction are determined from the resources that have already been allocated. Thus, actually unneeded resources of the resources previously allocated may result from this determination. Such actually unneeded resources are then deallocated (114).

It is noted that whereas clock cycles 102 and 104 are shown in FIG. 1 as separate, they may also overlap. For instance, the initial part of another transaction may be received in the second clock cycle 104. As another example, the remaining part of another transaction may be received in the first clock cycle 102. Furthermore, other transaction generators may only need one clock cycle, where their transactions may overlap with the second clock cycle of a transaction that needs two clock cycles.

Technical Background

Figure 2:
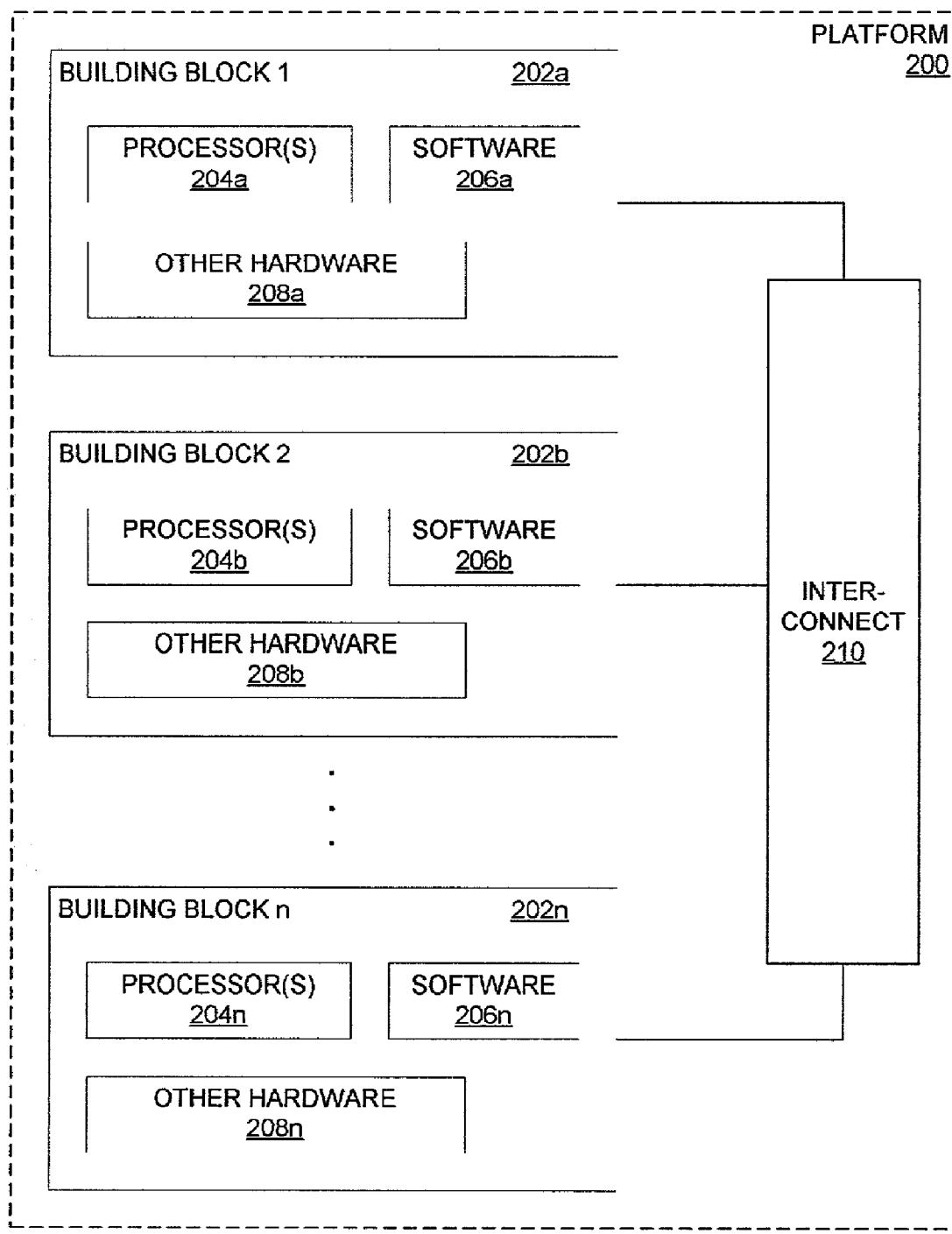
FIG. 2 is a diagram of an example platform having a number of example building blocks connected by an interconnect, in accordance with which embodiments of the invention may be practiced.

FIG. 2 shows an example platform 200 in conjunction with which embodiments of the invention may be practiced. The platform 200 includes a number of example building blocks 202a, 202b, . . . 202n, that are connected to one another via an interconnect 210. Each example building block has one or more processors, software, as well as other hardware, such as memory. For instance, the building block 202a has processor(s) 204a, software 206a, and other hardware 208a, whereas the building block 202b has processor(s) 204b, software 206b, and other hardware 208b. The building block 202n has processor(s) 204n, software 206n, and other hardware 208n. A building block can be non-restrictively defined as a grouping of at least one or more processors and memory, although the invention is not so limited.

The platform 200 itself can be a non-uniform memory access (NUMA) system, such as a cache-coherent (CC-NUMA) system, a NUMA-quad (NUMA-Q) system, and so on. Where the platform 200 is a NUMA-Q system, each example building block is a quad, or quad building block (QBB), having up to four processors, local memory, and input/output (I/O) hardware. The interconnect 210 may be a link, such as a crossbar or a scaleable coherent interconnect. The invention can also be implemented in conjunction with other systems, such as symmetric multi-processor (SMP) systems, and so on. The term platform as used herein is synonymous with the term system.

Figure 3:
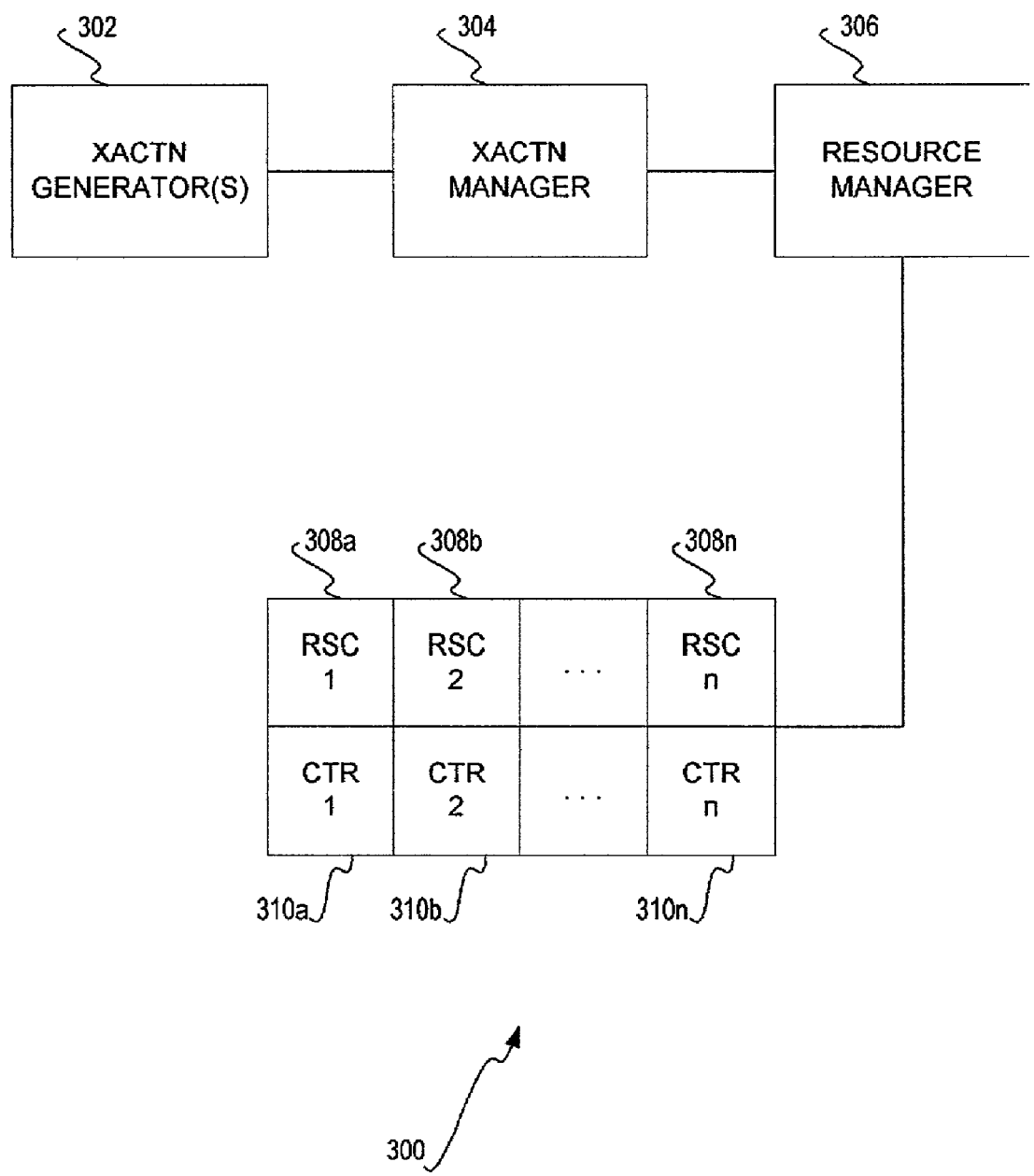
FIG. 3 is a diagram of a system in accordance with which embodiments of the invention may be practiced, and which can be implemented in conjunction with the example platform of FIG. 2.

FIG. 3 shows a system 300 in conjunction with which embodiments of the invention may also be practiced. The system 300 includes components 302, 304, and 306, specifically one or more transaction generators 302, a transaction manager 304, and a resource manager 306. Each of these components 302, 304, and 306 may be implemented in hardware, software, or a combination of hardware and software. The system 300 may be implemented within the platform 200. For instance, the various components 302, 304, and 306 may be implemented in a given building block of the platform 200, or may be implemented in a distributed manner over the platform 200, such as over all the building blocks of the platform 200.

The transaction generators 302 generate transactions. The transaction generators 302 most typically are processors executing software. Such transactions can include memory reads, memory invalidates, memory writes, I/O reads, I/O writes, interrupts, interrupt acknowledgments, as well as other types of transactions. The transaction manager 304 allocates and deallocates resources for the transactions of the transaction generators 302 and directs the transaction to the targeted destination. This is accomplished through the resource manager 306, which supervises allocation of resources. Such resources may include memory, I/O, as well as other types of resources, such as a bypass queue, a read or a write buffer, a partial write buffer, a register queue, a register request, a bus side-band, an outbound request credit, a transaction identifier, and so on.

The resource manager 306 maintains for the resources 308a, 308b, . . . , 308n associated counters 310a, 310b, . . . , 310n, respectively. The counter 310 associated with a corresponding resource 308 tracks the utilization or usage of the resource 308. When the resource 308 is allocated, the counter 310 associated with this resource 308 is decremented. Correspondingly, when the resource 308 is deallocated, the counter 310 associated with this resource 308 is incremented. Each of the resources 308a, 308b, . . . , 308n is initially set and can be subsequently reset with the maximum number of allocations that it can have at a given time, by the resource manager 306. The maximum number of allocations that a resource can have at a given time is referred to as the maximum availability of the resource. Thus, when the transaction manager 304 needs to allocate a resource using the resource manager 306, the resource manager 306 may indicate that the resource is currently fully allocated.

Resource Allocation and Deallocation

Figure 4A:
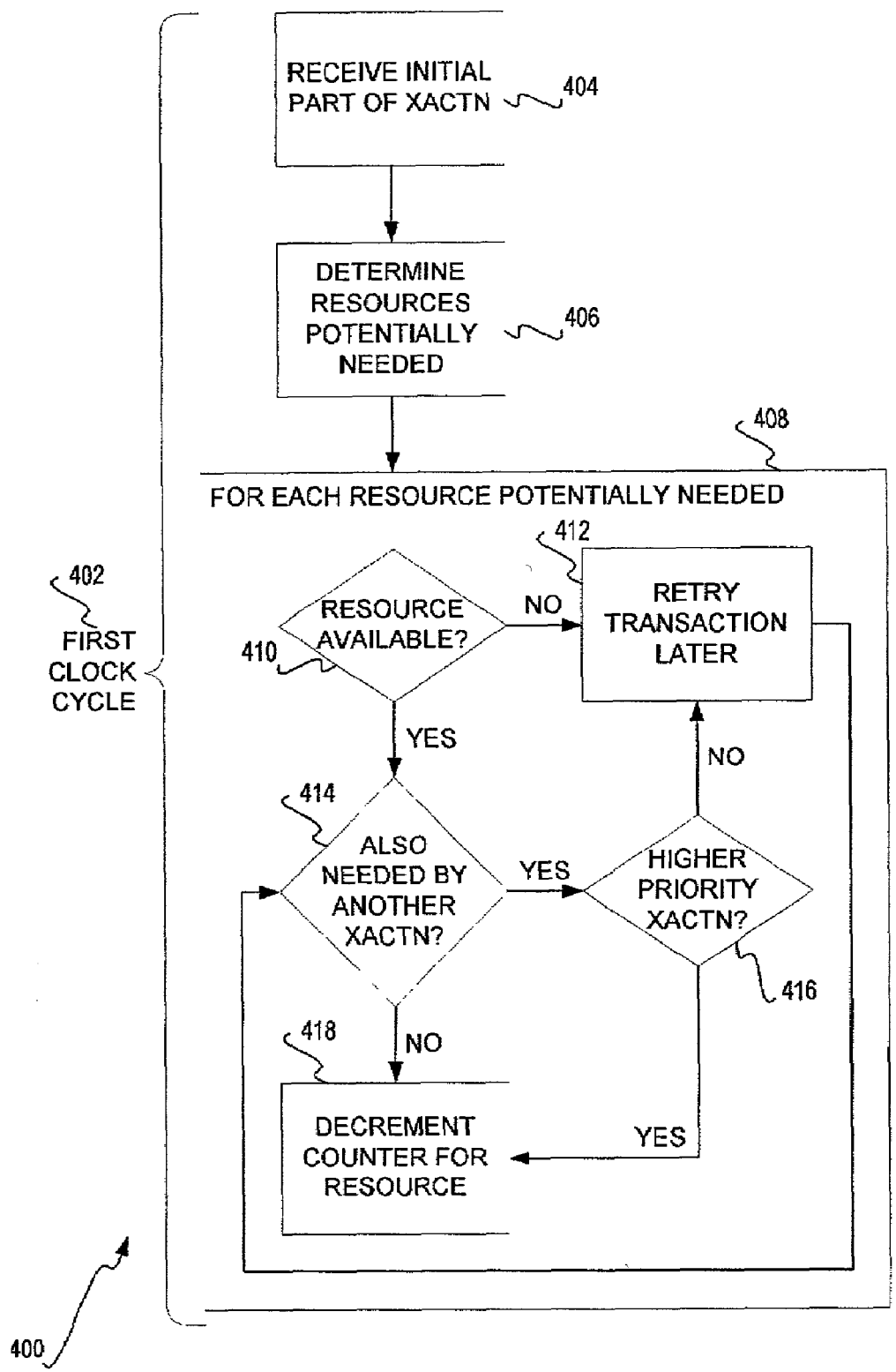
FIGS. 4A and 4B are flowcharts of a method according to an embodiment of the invention, which is consistent with the method of FIG. 1.
Figure 4B:
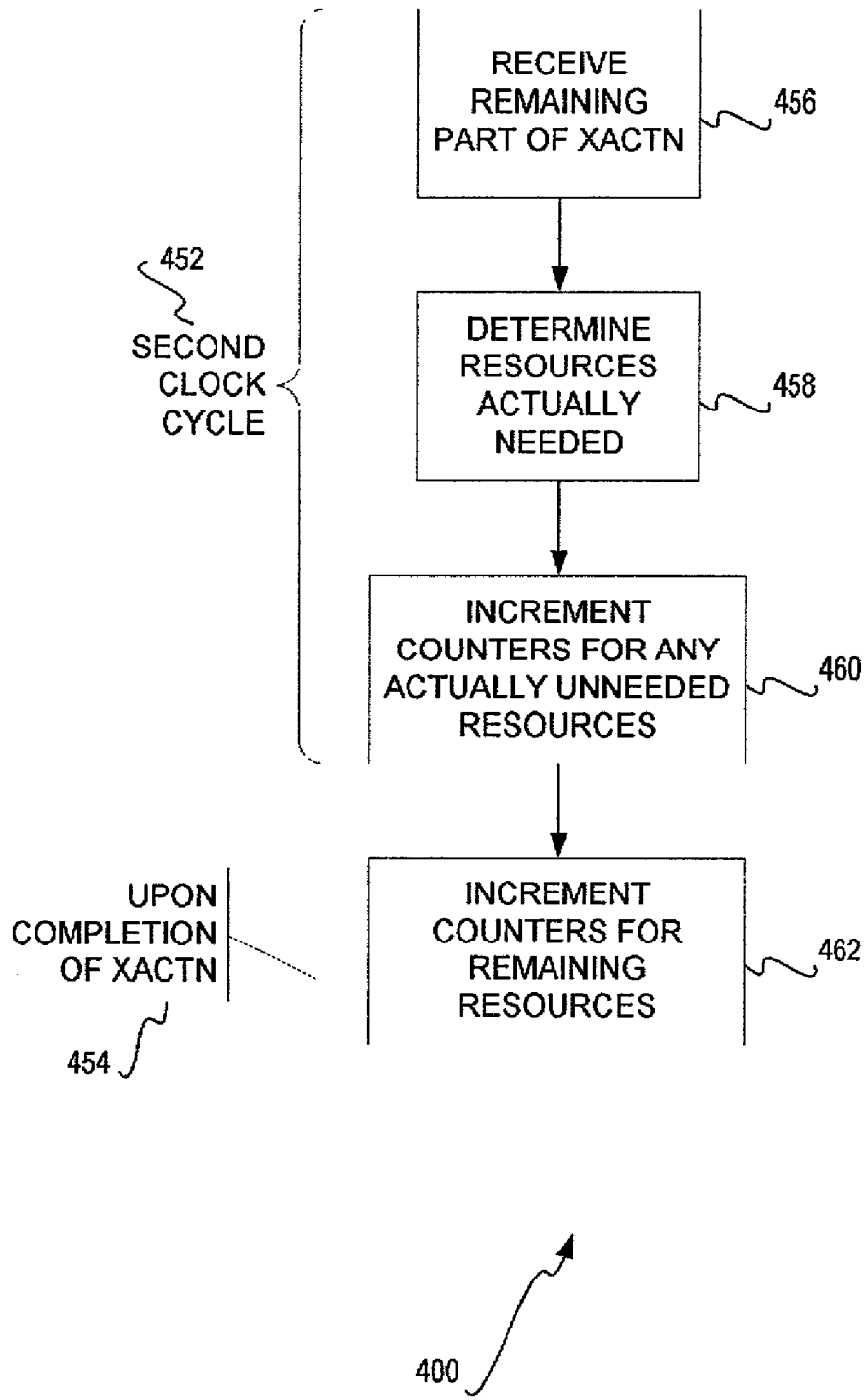

FIGS. 4A and 4B show a method 400 according to another embodiment of the invention. The method 400 is consistent with the method 100 of FIG. 1 previously described, but includes details not specifically shown in the method 100 of FIG. 1. Like the method 100 of FIG. 1, the method 400 may be implemented in conjunction with a computer-readable medium. The method 400 may also be implemented within the platform 200 of FIG. 2, and/or the system 300 of FIG. 3, that have been described. The method 400 is divided into three parts: steps or acts performed in a first clock cycle, as indicated by the reference number 402; steps or acts performed in a second clock cycle, as indicated by the reference number 452; and, steps or acts performed upon completion of the transaction, as indicated by the reference number 454.

In the first clock cycle, an initial part of the transaction is received (404), and the resources potentially needed by the transaction based on the initial part thereof are determined (406). 408 is then performed for each of these potentially needed resources. If a resource is not available for allocation (410), then the transaction is retried at a later time, until it is accepted (412). More specifically, the transaction manager performing the method 400 issues a retry back to the transaction generator, which retries the request at a later time. The method 400 also determines whether the resource is concurrently needed by another transaction, from another processor or other transaction generator (414). If it is, then the method 400 determines whether the transaction received in 404 is the higher priority transaction (416). If the transaction received in 404 does not have higher priority, then the method 400 again waits for the availability of the resource for this transaction (412). Ultimately, once the resource is available and is not subject to allocation by a higher-priority transaction, the resource is allocated by decrementing its associated counter (418).

As an example, in the first clock cycle, two transaction generators may send initial parts of transactions, where one transaction has higher priority than the other transaction. Some resources may be potentially needed by both transactions. If such resources are sufficiently available for both transactions, then these resources are allocated for each of the two transactions. However, if such resources are available for allocation to only one of the two transactions, then the higher-priority transaction receives allocation of these resources. Furthermore, such resources may not be available for allocation to either transaction, in which case both resources wait for availability of these resources, and the higher-priority transaction again receives first allocation of them.

In one embodiment, resource allocation vectors (RAVs) are used to determine whether resources are sufficiently available for both transactions. A transaction manager can examine a RAV to determined immediately whether the needed resources are available. A second, lower-priority transaction manager may examine a slightly different RAV if it has been already determined that the last unit of an available resource should go to a higher-priority transaction manager. For instance, if there is only one entry available for a given queue, the higher-priority transaction manager will see a RAV indicating that the resource is available, whereas the lower-priority transaction manager will see a RAV indicating that the resource is not available.

In the second clock cycle, the remaining part of the transaction is received (456), and the resources actually needed by the transaction based on the remaining part thereof are determined (458). The resources actually needed are a subset of the resources that were previously allocated, such that actually unneeded resources that were nevertheless allocated may exist. The associated counters for such actually unneeded resources are then incremented (460). This deallocates these resources, since they are not needed. Upon the completion of the transaction, the counters for the remaining resources, which are the resources that were actually needed by the transaction, are also incremented to deallocate them (462).

It is noted that the resources are preferably managed such that resources from multiple transaction managers can be released and allocated in the same clock cycle. This can be true with even a single transaction manager. For example, a transaction manager may be allocating a resource based on first clock cycle information, while releasing that same resource based on the second clock cycle information of a previous transaction.

Specific Implementation

FIG. 5 shows a table 500 indicating, in one embodiment of the invention, which potentially needed resources are allocated for a given type of transaction, where the transaction is only partially received in a first clock cycle. The table 500 is specifically for a multi-processor system having a number of building blocks, such as the platform 200 of FIG. 2. Each building block has memory that is shared with the other building blocks, and the memories of all the building blocks are accessible with a single memory map. Each building block may also have memory that is private to itself, and a cache to cache remote shared memories of the other building blocks.

Each building block has one or more transaction generators that generate transactions. There are eleven general types of transactions, indicated by the horizontal lines 510, 512, 514, 516, 518, 520, 522, 524, 526, 528 and 530. The target or region to which the transaction relates is indicated by the column 502, whereas whether this target or region is local or remote is indicated by the column 504. The actual name of the transaction is indicated by the column 506, whereas the transaction proposed to be sent to the interconnect, such as the interconnect 210 of FIG. 2, based on the information available in the first clock cycle, is indicated by the column 507. The transactions identified by column 507 include local cache read (LCR), local cache read-invalidate (LCRI), local uncached write (LUW), remote cache read (RCR), remote cache read-invalidate (RCRI), remote uncached write (RUW), memory-mapped I/O read (MMR), and memory-mapped I/O write (MMW). Column 507 also indicates ABRT, for abort, and "n/a" for not applicable. For the LCR, LCRI, LUW, RCR, RCRI, RUW, MMR, and MMW transactions, the transaction is sent to the interconnect. Conversely, ABRT in column 507 indicates that no transaction is sent to the interconnect. The resources potentially needed by the transaction and thus preliminarily allocated are indicated by the column 508.

The horizontal line 510 is for any transaction that relates to private, local memory of the building block itself. As such, no resources are allocated, as indicated by the dash ("-") in column 508 for the horizontal line 510. The horizontal lines 512 are for transactions that relate to shared local or remote memory of the building blocks. For either local or remote memory, the transaction can be a memory read, a memory read-invalidate, which invalidates the memory after it is read, or a memory write. Resources are preliminary allocated only for a memory write transaction. This resource is specifically the partial write buffer (PWB), which may or may not be required.

The horizontal lines 514 are for transactions that relate to the control status registers (CSR) of the building blocks 202a, 202b, 202n that are mapped to memory space and can be accessed by local or remote memory transactions. The transaction can be either a memory write or a memory read. For local memory-related transactions, the resource allocated is the CSR queue. No local resources are allocated for remote memory-related transactions. The horizontal lines 516 are for transactions that relate only to the interconnect 210 CSRs which can be accessed by a memory read or a memory write transaction. In either case, the resource allocated is the CSR itself. The horizontal lines 518 relate to CSRs in the configuration space, which resides across I/O buses, where the transaction can be either an I/O read or an I/O write. In both cases the resources allocated include the CSR queue, and the peripheral component interconnect (PCI) bus 0. This is necessary since the CSR may reside on the local device or on the configuration PCI bus (bus 0), which is unknown until the second clock cycle.

The horizontal lines 520 relate to the PCI bus, specifically configuration data thereof. The transaction can be either an I/O read or an I/O write. In both cases, the resource allocated is the PCI bus to which the transaction relates. The horizontal lines 522 relate to memory mapped I/O (MMIO) on the PCI bus, which may be either local or remote I/O. The transaction can be either a memory read or a memory write. For local MMIO, the PCI bus to which the transaction relates is allocated, whereas no local resources are allocated from remote MMIO. The horizontal lines 524 relate to memory on the PCI bus, which may also be either local or remote. The transaction can be either an I/O read or an I/O write. In either case, the resource allocated is the PCI bus to which the transaction relates. Which PCI bus is unknown during the first cycle and thus is denoted with an "x".

The horizontal line 526 relates to the local compatibility bus (PCI bus 0), where the transaction may be a special transaction or an interrupt acknowledgment transaction. In either case, the resource allocated is the PCI bus 0. The horizontal lines 528 are for transactions relating to either the local or remote processor bus referred to as the P7 bus, where the transaction may be an interrupt transaction or a purge translation cache (PTC) transaction. In either case, no resource is allocated. Finally, the horizontal line 530 is for transactions relating to debug trace messages (TRR), where the transaction can only be a memory write. No resource is allocated for such a transaction.

FIG. 6 shows a table 600 indicating, in one embodiment of the invention, which resources that were previously allocated per the table 500 of FIG. 5 are subsequently released in the second clock cycle once it has been determined that they are not actually needed. The table 600 is thus for the same type of multi-processor system described in conjunction with the table 500 of FIG. 5. During the second clock cycle, the proposed ID cycle identified in column 507 of table 500 of FIG. 5 is used where applicable in conjunction with the newly available second clock cycle information to determine which resources are to be released. There are five general types of transactions, indicated by the horizontal lines 608, 610, 612, 614, and 616. Column 602 indicates the type of transaction, where memory-related transactions are specifically identified by an ID cycle. The ID cycle of column 602 is that which was previously indicated in column 507 of table 500 of FIG. 5, so that it can be determined which row in the table 600 should be applied in the second clock cycle. Column 604 indicates the qualifier that must be true for the resource indicated in column 606 to be released as actually unneeded.

The horizontal lines 608 are for memory-related transactions. These transactions include local cache read (LCR), local cache read-invalidate (LCRI), local uncached write (LUW), remote cache read (RCR), remote cache read-invalidate (RCRI), remote uncached write (RUW), memory-mapped I/O read (MMR), and memory-mapped I/O write (MMW). Resources are released as unneeded only in certain instances of LUW and RUW. For either transaction, if its attribute is equal to write back (WB), or if its attribute is equal to write coalescing (WC) and its length is 64 bytes that indicate a full cache line write, then the PWB is released.

The horizontal lines 610 and 612 are for I/O read-related transactions and for I/O write-related transactions, respectively. In either case, the PCI bus 0 is released if the address of the I/O is CF8, and the first eight bits of BE are 00001111 indicating a local building block CSR access that does not require the PCI bus. Also in either case, the CSR queue is released in two instances. First, it is released if the address of the I/O is CF8, and the first eight bits of byte enabled (BE) are not 00001111. Second, it is released if the address of the I/O is CFC, the first four bits of BE are 0000, and the configuration space of the PCI bus is enabled. Furthermore, where the accesses are to I/O addresses other than CF8, then the unused PCI buses are released, where x, y, and z indicate the PCI buses that are released.

The horizontal lines 614 are for special or interrupt acknowledgment transactions. The PCI bus 0 is the resource released where the first bit of the request in the second clock cycled, which is referred to as REQb, is one, and the first eight bits of BE are either 00000000 or 00001000. Finally, the horizontal lines 616 are for interrupt or PTC transactions. In this case, no resources are released as actually unneeded.

Advantages over the Prior Art

Embodiments of the invention allow for advantages over the prior art. Transactions can be issued based on information received in the first clock cycle. This means that the completion time of such transactions is reduced by one clock cycle, decreasing latency. Furthermore, when there are multiple transaction generators, the transaction manager can handle a new transaction every clock cycle, increasing bandwidth. In addition, because unused resources are released in the second clock cycle, resource utilization is optimized, with unused resources being unnecessarily allocated for only up to one clock cycle. Because a new two-cycle transaction can be issued every clock cycle, it is also possible to mix transaction generators that only need a single clock cycle with those that require two clock cycles.

Alternative Embodiments

It will be appreciated that, although specific embodiments of the invention have been described herein for purposes of illustration, various modifications may be made without departing from the spirit and scope of the invention. For instance, whereas the invention has been substantially described in relation to a multi-processor system, it is also applicable to single-processor systems as well. Furthermore, although the invention has been described with respect to transactions that are completely received in two clock cycles, it is also applicable to transactions that are completely received in three or more clock cycles. In such instances, the invention may or may not also determine the resources required at the end of each interim clock cycle as well as at the end of the final clock cycle. Unused resources in such instances may or may not be released at the end of each interim clock cycle as well as at the end of the final clock cycle. Accordingly, the scope of protection of this invention is limited only by the following claims and their equivalents.

The invention claimed is:

1. A computer-implemented method performed in relation to a multi-processor system having a number of building blocks interconnected to one another via one of a crossbar and a scaleable coherent interconnect, the method comprising:

in a first clock cycle,
receiving an initial part of a non-network transaction by one of the building blocks from another of the building blocks, the transaction selected from the group essentially consisting of: a memory read, a memory invalidate, a memory write, an input/output (I/O) read, an I/O write, an interrupt, and an interrupt transaction;
determining, in only the first clock cycle, non-network resources potentially needed by the transaction based on the initial part of the transaction received, the resources potentially needed by the transaction including resources actually needed by the transaction, the resources selected from the group essentially consisting of: memory, I/O, a bypass queue, a read or write buffer, a partial write buffer, a register queue, a register request, a bus side-band, an outband request credit, and a transaction identifier;
allocating the resources potentially needed by the transaction;
in a final clock cycle,
receiving a final part of the transaction; and,
determining the resources actually needed by the transaction from the resources potentially needed that were previously allocated, based at least on the final part of the transaction received.

2. The method of claim 1, further comprising, in a second clock cycle, receiving a second part of the transaction, wherein determining the resources actually needed is further based on the second part of the transaction received.

3. The method of claim 1, further comprising, in a second clock cycle, receiving a second part of the transaction, and determining actually unneeded resources of the resources previously allocated based on the second part of the transaction received.

4. The method of claim 3, further comprising, in the second clock cycle, deallocating the actually unneeded resources determined.

5. The method of claim 1, further comprising, in each of at least one interim clock cycle, receiving an additional part of the transaction, wherein determining the resources actually needed is further based on the additional part of the transaction received in said each of at least one interim clock cycle.

6. The method of claim 1, further comprising, in each of at least one interim clock cycle, receiving an additional part of the transaction, and determining actually unneeded resources of the resource previously allocated based on the additional part of the transaction received.

7. The method of claim 6, further comprising, in said each of at least one interim clock cycle, deallocating the actually unneeded resources determined.

8. The method of claim 1, wherein determining the resources actually needed by the transaction results in actually unneeded resources of the resources previously allocated, the method further comprising deallocating the actually unneeded remaining resources in the final clock cycle.

9. The method of claim 8, wherein for each of a plurality of resources, including the resources potentially needed by the transaction, an associated counter initially has a value equal to a maximum availability of the resource, and wherein deallocating the actually unneeded remaining resources comprises, for each of the actually unneeded remaining resources, incrementing the associated counter.

10. The method of claim 1, wherein for each of a plurality of resources, including the resources potentially needed by the transaction, an associated counter initially has a value equal to a maximum availability of the resource, and wherein allocating the resources potentially needed by the transaction comprises, for each of the resources, decrementing the associated counter.

11. The method of claim 1, wherein allocating the resources potentially needed by the transaction comprises, for each of the resources,
determining whether the resource is available; and,
upon determining that the resource is available, allocating the resource.

12. The method of claim 11, wherein allocating the resources potentially needed by the transaction further comprises, for each of the resources, upon determining that the resource is unavailable,
retrying the transaction until the resource is available; and,
accepting the transaction and allocating the resource.

13. The method of claim 1, further comprising, in the first clock cycle, receiving an initial part of an additional transaction;
determining resources potentially needed by the additional transaction based on the initial part of the additional transaction received;
determining whether any of the resources are potentially needed by both the transaction and the additional transaction;
in response to determining that any of the resources are potentially needed by both the transaction and the additional transaction,
allocating the resources that are potentially needed by both the transaction and the additional transaction where the resources are sufficiently available for both the transaction and the additional transaction.

14. The method of claim 13, further comprising, in the first clock cycle, in response to determining that the resources that are potentially needed by both the transaction and the additional transaction are insufficiently available for both the transaction and the additional transaction,
allocating the resources that are potentially needed by both the transaction and the additional transaction to a higher priority one of the transaction and the additional transaction.

15. The method of claim 1, further comprising, deallocating the resources actually needed by the transaction upon completion of the transaction.

16. The method of claim 15, wherein for each of a plurality of resources, including the resources potentially needed by the transaction, an associated counter initially has a value equal to a maximum availability of the resource, and wherein deallocating the resources actually needed by the transaction comprises, for each of the resources actually needed, incrementing the associated counter.

17. A system comprising:
a plurality of building blocks;
one of a cross bar and a scaleable coherent interconnect interconnecting the building blocks;
one or more transaction generators located within the building blocks, each transaction generator capable of generating non-network transactions, the transactions selected from the group essentially consisting of: a memory read, a memory invalidate, a memory write, an input/output (I/O) read, an I/O write, an interrupt and an interrupt transaction; and,
a transaction manager capable of receiving each of the transactions generated by the one or more transaction generators over at least one clock cycle, of allocating non-network resources potentially needed by each of the transactions upon partially receiving the transaction in only a first clock cycle, and of deallocating actually unneeded resources from the resources previously allocated after completely receiving the transaction in a final clock cycle,
wherein the resources are selected from the group essentially consisting of: memory, I/O, a bypass queue, a read or write buffer, a partial write buffer, a register queue, a register request, a bus side-band, an outband request credit, and a transaction identifier.

18. The system of claim 17, wherein the transaction manager is further capable of, in a second clock cycle, receiving a part of each transaction and determining resources actually needed by the transaction based on the part of the transaction received.

19. The system of claim 17, wherein the transaction manager is further capable of, in a second clock cycle, receiving a part of each transaction and determining at least some of the actually unneeded resources from the resources previously allocated based on the part of the transaction received.

20. The system of claim 19, wherein the transaction manager is further capable of deallocating said at least some of the actually unneeded resources.

21. The system of claim 17, further comprising a resource manager supervising allocation of a plurality of resources, the transaction manager allocating the resources potentially needed and deallocating the actually unneeded resources through the resource manager.

22. The system of claim 21, wherein the resource manager maintains a counter for each of the plurality of resources, the counter initially having a value equal to a maximum availability of the resource, the resource manager decrementing the counter upon allocation of the resource, and incrementing the counter upon deallocation of the resource.

23. The system of claim 21, wherein the resource manager maintains a counter for each of the plurality of resources, and initially loads a value equal to an available of the resource to the counter.

24. The system of claim 17, wherein at least one of the transactions is one of: a memory read, a memory read-invalidate, a memory write, an input/output (I/O) read, an I/O write, an interrupt, and an interrupt acknowledgment.

25. The system of claim 17, wherein at least one of the resources is one of: a bypass queue, a read buffer, a write buffer, a partial-write buffer, a register queue, a register request, a bus side-band, an outbound request credit, and a transaction identifier.

26. An article comprising:
a computer-readable medium; and,
means in the medium for allocating non-network resources potentially needed by a non-network transaction in relation to a multi-processor system having a number of building blocks interconnected to one another via one of a crossbar and a scaleable coherent interconnect,
wherein the transaction is partially received in only a first clock cycle by one of the building blocks from another of the building blocks, and the means is further for deallocating actually unneeded resources from the resources previously allocated after completely receiving the transaction in a final clock cycle,
the transaction selected from the group essentially consisting of: a memory read, a memory invalidate, a memory write, an input/output (I/O) read, an I/O write, an interrupt, and an interrupt transaction, and
the resources selected from the group essentially consisting of: memory, I/O, a bypass queue, a read or write buffer, a partial write buffer, a register queue, a register request, a bus side-band, an outband request credit, and a transaction identifier.

27. The article of claim 26, wherein the means further is for determining resources actually needed based on a part of the transaction received in a second clock cycle.

28. The article of claim 26, wherein the means further is for determining at least some of the actually unneeded resources of the resources previously allocated based on a part of the transaction received in a second clock cycle.

29. The article of claim 28, wherein the means further is for deallocating said at least some of the actually unneeded resources.

30. The article of claim 26, wherein the means allocates each of the resources potentially needed by decrementing an associated counter, the associated counter initially having a value equal to a maximum availability of the resource.

31. The article of claim 26, wherein the means deallocates each of the actually unneeded resources by incrementing an associated counter, the associated counter initially having a value equal to a maximum availability of the resource.

32. The article of claim 26, wherein the medium is one of a recordable data storage medium and a modulated carrier signal.

* * * * *